United States Patent
Kurz et al.

[11] Patent Number: 6,130,311
[45] Date of Patent: Oct. 10, 2000

[54] BIAXIALLY ORIENTED PET FILM HAVING ENHANCED MECHANICAL AND SHRINKING PROPERTIES AND METHOD FOR THE PRODUCTION OF THE SAME

[75] Inventors: Rainer Kurz, Taunusstein; Holger Kliesch, Mainz-Kastel; Cynthia Bennett, Alzey; Annegrete Bursch, Ruedesheim; Franz Hora, Kriftel; Bodo Kuhmann, Runkel; Ulrich Schaller, Floersheim-Wicker, all of Germany

[73] Assignee: Mitsubishi Polyester Film GmbH, Wiesbaden, Germany

[21] Appl. No.: 09/269,175

[22] PCT Filed: Sep. 23, 1997

[86] PCT No.: PCT/EP97/05208

§ 371 Date: Jun. 30, 1999

§ 102(e) Date: Jun. 30, 1999

[87] PCT Pub. No.: WO98/13415

PCT Pub. Date: Apr. 2, 1998

[30] Foreign Application Priority Data

Sep. 24, 1996 [DE] Germany ............... 196 39 056
Aug. 21, 1997 [DE] Germany ............... 197 36 394
Aug. 21, 1997 [DE] Germany ............... 197 36 398

[51] Int. Cl.[7] .................................. C08G 63/02
[52] U.S. Cl. .................. 528/272; 528/193; 528/271
[58] Field of Search ................... 528/193, 271, 528/272

[56] References Cited

U.S. PATENT DOCUMENTS

| | | | |
|---|---|---|---|
| 4,042,569 | 8/1977 | Bell et al. .................. | 528/176 |
| 4,311,741 | 1/1982 | Wong ........................ | 428/35 |
| 4,746,703 | 5/1988 | Dallmann et al. ......... | 525/176 |
| 4,806,398 | 2/1989 | Martin, Jr. ................ | 428/34.2 |
| 4,900,594 | 2/1990 | Quick et al. .............. | 428/34.2 |
| 4,985,537 | 1/1991 | Utsumi et al. ............ | 528/272 |
| 5,156,904 | 10/1992 | Rice et al. ................ | 428/219 |
| 5,545,364 | 8/1996 | Song et al. ............... | 264/210.5 |
| 5,574,119 | 11/1996 | Yamada et al. ........... | 528/310 |
| 5,582,319 | 12/1996 | Heyes et al. ............. | 220/454 |

FOREIGN PATENT DOCUMENTS

| | | |
|---|---|---|
| 0 225 631 | 6/1987 | European Pat. Off. . |
| 0 228 601 | 7/1987 | European Pat. Off. . |
| 0 402 861 | 12/1990 | European Pat. Off. . |

OTHER PUBLICATIONS

TORA, Derwent Publications Ltd., JP–173100, "Heat Treatment of Biaxially Drawn Polyester Film", (Oct. 30, 1981).
TORA, Derwent Publications Ltd., JP–153988, "Optical Recording Film", (Jul. 2, 1986).

*Primary Examiner*—Terressa M. Boykin
*Attorney, Agent, or Firm*—Foley & Lardner

[57] ABSTRACT

The invention relates to a biaxially oriented polyester film having one or more layers and a thickness of $\leq 10\,\mu m$, where the mechanical consolidation coefficient MC, given by the following equation, lies within the ranges given below:

MC here is $\geq -2$, preferably $>0$ and in particular $>0.5$, particularly preferably $\geq 1$, and is $\leq 50$, preferably $\leq 30$ and particularly preferably $<5$ $$V = \frac{S2000_{TD}[\%](T2\% - 100\,[°C.])(S2000_{MD} - 3.35\,[\%])}{(E_{ND} - 3000\,[N/mm^2])} * 1000\,[°C. \cdot mm^2 \cdot N^{-1}]$$

$S200_{TD}$ is the transverse shrinkage in % at 200° C. after 15 min.

S200MD is the longitudinal shrinkage in % at 200° C. after 15 min.

T2% is the temperature in ° C. at which the film elongates by 2% under a constant tension of 5 $N/mm^2$.

$E_{TD}$ is the transverse modulus of elasticity (tensile modulus) at room temperature (21° C.) in $N/mm^2$.

8 Claims, No Drawings

BIAXIALLY ORIENTED PET FILM HAVING ENHANCED MECHANICAL AND SHRINKING PROPERTIES AND METHOD FOR THE PRODUCTION OF THE SAME

The present invention relates to polyester films, in particular PET films whose improved shrinkage properties make them particularly suitable for producing capacitors for SMD technology. Films having a small thickness and heat resistance are required in particular for capacitors which are used in SMD technology. This has advantages in terms of the space occupied by the capacitor and in the soldering process.

At present, PEN and PPS films are used for film capacitors in SMD technology. PEN and PPS films have a markedly higher melting point, PEN about 265° C. and PPS about 285° C., than PET films (about 255° C.) and therefore have different shrinkage characteristics. However, a decisive disadvantage is the high price of such PEN and PPS films. It is known that PET films currently available on the market are unsuitable for producing capacitors for SMD technology, or have only very restricted suitability within particular limiting conditions, such as with encapsulation or through reducing the maximum permitted soldering temperatures to about 200° C. The PET capacitors are mechanically unstable after the heat treatment required for production.

In order that PET films have the required heat stability, a large number of properties (inter alia the shrinkage, particularly transverse shrinkage at high temperatures) must remain within particular ranges, to ensure the capacitors have soldering-bath stability.

According to JP-B-63/004499 (Toray) low shrinkage values for biaxially oriented polyester films are obtained by carrying out an additional heat-treatment step.

EP-A-0 402 861 (DHC) and JP-A-63/011326 (Toray) describe films with very low longitudinal shrinkage. EP-A-0 402 861 describes a first heat-treatment step at from 225 to 260° C. with a relaxation of from 1 to 15% and a subsequent, second relaxation of from 0.01 to 10% at temperatures below 180° C. These films are therefore disadvantageous, since the longitudinal shrinkage described is so low that the capacitors produced therefrom are not sufficiently consolidated. This results in poor insulation resistance.

It was an object of the present invention to provide a PET film having SMD capabilities, and not having the disadvantages described above. The capacitors produced from the film should, after heat-treatment, be mechanically stable, and also soldering-bath-stable.

This object is achieved by means of a biaxially oriented film having one or more layers and a thickness of $\leq 10 \, \mu m$, where the mechanical consolidation coefficient MC, given by the following equation, lies within the ranges given below:

MC is $\geq -2$, preferably $\geq 0$, in particular $\geq 0.5$, particularly preferably $\geq 1$, and is $\leq 50$, preferably $\leq 30$ and particularly preferably $\leq 5$.

$$MC = \frac{S200_{TD}[\%](T2\% - 100[°C.])(S200_{MD} - 3.35[\%])}{(E_{ND} - 3000[N/mm^2])} * 1000[°C. \cdot mm^2 \cdot N^{-1}]$$

In addition, not more than one of the coefficients $S200_{TD}$, $(T2\%-100)$, $S200_{MD}-3.35)$ and $(E_{TD}-3000)$ may be negative.

$S200_{TD}$ is the transverse shrinkage in % (TD=transverse direction) after 15 min at 200° C.

$S200_{MD}$ is the longitudinal shrinkage in % (MD=machine direction) after 15 min at 200° C.

T2% is the temperature in ° C. at which the film elongates by 2% under a constant tension of 5 N/mm².

ETD is the transverse modulus of elasticity (tensile modulus) at room temperature (21° C.) in N/mm².

The thickness of the novel film is $\leq 10 \, \mu m$, preferably $\leq 8 \, \mu m$ and in particular $\leq 6 \, \mu m$.

Two steps are particularly important for the suitability of a film for producing SMD capacitors. These are firstly the winding of the wound elements followed by heat-treatment to consolidate the capacitors, and secondly the heat resistance of the capacitors during the soldering process. It has been found that the MD and TD shrinkage properties of the film are decisive factors in the heat resistance, in particular the dimensional stability, of the finished capacitors. The relationship here is that the lower the MD and TD shrinkage at high temperatures (200° C.) the better the heat resistance. Low shrinkage values therefore give the desired small MC values in the formula above. However, on the other hand the shrinkage is important for consolidation of the wound elements during the heat-treatment step. If the windings are not sufficiently consolidated the resultant capacitors have inadequate insulation resistances and unacceptably high values for the dielectric dissipation factor tan$\delta$. SMD suitability therefore requires a balance: a particularly low but still sufficient shrinkage. Both transverse and longitudinal shrinkage contribute to the consolidation mentioned. However, the contribution from longitudinal shrinkage is of much greater importance. Low tranverse shrinkage can therefore be tolerated more readily than too low a longitudinal shrinkage. Values for $S200_{MD}$ of less than 3.35% have proven very disadvantageous. At relatively low shrinkage values they cause the coefficient in the formula to be negative and take MC outside the ideal range.

$S200_{TD}$ values of less than or equal to 1% have proven particularly advantageous, values of less than 0.8% being preferred.

However, the consolidation of the layer assembly is a function not only of the shrinkage but also of other, in particular mechanical, properties of the film. The pressure on the layers produced by the winding tension and the longitudinal shrinkage causes elongation of the film and therefore consolidation. This elongation depends, for example, on the modulus of elasticity at the particular temperature, since a film of high mechanical strength is less easy to elongate than a film with a lower modulus of elasticity. The tendency of the film to elongate transversely under pressure and at a particular temperature can best be measured not by applying pressure but by using a small and constant force to convey tension to the film. It has proven advantageous here for the properties of the film if the temperature at which the film shows a length increase of at least 2% (T2%) under a tension of 5 N/mm² is very low. (For standard capacitor films this temperature is above 150° C. and for the novel films it is ideally from 100 to 140° C., preferably from 100 to 130° C.) This means that the pressure of the layers arising during the heat treatment causes consolidation of the layers at an early stage. However, problems arise if the length increase of 2% occurs even at very low temperatures below 100° C. The heat-treatment temperture must then be reduced, and this in turn markedly impairs soldering-bath stability.

Low values for T2% could, for example, be achieved via low transverse moduli of elasticity. However, very low values which are markedly below 4000 N/mm² are again disadvantageous. Although moduli of elasticity of this type do not have any direct adverse influence on SMD suitability, they generally impair the electrical properties of the film.

The inclusion of the modulus of elasticity in the formula above takes account of this fact.

The density of the polyester used for producing the film is usefully from 1.385 to 1.410 g/cm$^3$. Films with values above 1.410 tend to crystallinity and could cause brittleness of the film during capacitor production and therefore on occasions cause failure of the capacitor. If the density is less than 1.385, the shrinkage of the film could be too great, or the modulus of elasticity too small, or the susceptibility to hydrolysis too great.

The novel film is preferably produced from polyester raw materials. For the purposes of the invention, polyester raw materials are formulations in which the predominant part, i.e. at least 80% by weight, preferably at least 90% by weight, is composed of a polymer selected from the class consisting of polyethylene terephthalate (PET), polyethylene naphthalate (PEN), poly-1,4-dicyclohexanedimethylene terephthalate (PCT), polyethylene naphthalate bibenzoate (PENBB) or mixtures of these polymers. Preference is given to polyester raw materials built up essentially from ethylene terephthalate units and/or up to 50 mol % of comonomer units, where the glycol component and/or the acid component of the comonomer units may vary. The polyesters may be prepared either by the transesterification process with the usual catalysts, such as salts of Zn, of Ca, of Li or of Mn, or else by the direct esterification process.

If desired, the polyester raw material comprises the additives (particles) usual in the production of capacitor films for improving slip properties and friction properties, for example inorganic pigments, such as kaolin, talc, $SiO_2$, $MgCO_3$, $CaCO_3$, $BaCO_3$, $CaSO_4$, $BaSO_4$, $LiPO_4$, $Ca_3(PO_4)_2$, $Mg_3(PO_4)_2$, $TiO_2$, $Al_2O_3$, MgO, SiC, LiF or the Ca, Ba or Mn salts of terephthalic acid. However, it is also possible to add particles based on crosslinked, infusible organic polymers, such as polystyrenes, polyacrylates or polymethacrylates. The particles are preferably used in concentrations of from 0.005 to 5.0% by weight, particularly preferably from 0.01 to to 2.0% by weight (based on the weight of the layer). The average particle size is from 0.001 to 10 $\mu$m, preferably from 0.005 to 5 $\mu$m.

The polyester films may be produced by known processes from abovementioned raw materials or by combining abovementioned polyester raw materials with other raw materials or with conventional additives in usual amounts of from 0.1 to not more than 10% by weight, either as monofilms or else as films which have more than one layer and may, if desired, have been coextruded and whose surfaces are identical or differently formed, where one surface, for example, has pigmentation and the other surface is unpigmented. Known processes may also be used to provide one or both surfaces of the film with a conventional, functional coating.

In the preferred extrusion process for producing the polyester film, the melted polyester material is extruded through a slot die and, in the form of a substantially amorphous prefilm, quenched on a chill roll. This film is then reheated and stretched longitudinally and transversely, or transversely and longitudinally, or longitudinally and transversely and again longitudinally and/or transversely. The stretching temperatures are generally from $T_g+10°$ C. to $T_g+60°$ C., and the stretching ratio for the longitudinal stretching is usually from 2 to 6, in particular from 3 to 4.5, and that for the transverse stretching is from 2 to 5, in particular from 3 to 4.5, and that for any second longitudinal stretching carried out is from 1.1 to 3. If desired the first longitudinal stretching may be carried out simultaneously with the transverse stretching (simultaneous stretching). Depending on the way in which the streching plant used has been constructed, the known independent variables of stretching ratio, stretching temperature and stretching rate should be harmonized with one another in such a way that the measured variables of modulus of elasticity, shrinkage and T2% lie within the desired ranges. Low transverse stretching ratios (<4) are advantageous here, as are moderate to high (>3.6) longitudinal stretching ratios. Combined with the setting temperatures and relaxations given below, the values desired can be obtained with, for example, a transverse stretching ratio of from 3.6 to 4.0, preferably from 3.7 to 3.9, particularly preferably around 3.8, and a longitudinal stretching ratio of from 3.6 to 4.2, preferably from 3.7 to 4.0, particularly preferably around 3.9.

This is followed by the heat-setting of the film at oven temperatures of from 200 to 260° C., in particular from 220 to 250° C. The decisive factor for producing the novel film is the actual temperature experienced by the film and not the surrounding temperature in the production process. For example, at very high speed of the production machine the oven temperature, i.e. the surrounding temperature, may lie considerably above the temperature which the film actually experiences as it passes through this oven. The maximum temperature which the film actually experiences during its production process can be determined using DSC analysis on a finished film (=maximum temperature experienced= film setting peak). This temperature should be from 225 to 245° C., preferably from 230 to 240° C.

In the setting zone, the film is relaxed transversely by a total of from 5 to 15%. The decisive factor apart from this total relaxation of from 5 to 15% is the rate of relaxation, which according to the invention is <20%/s. This is important for adjusting the transverse shrinkage. The rate of relaxation is the quotient calculated from the relaxation in % and the time in s during which the relaxation takes place.

The relaxation may take place in two or more discrete steps, or else in one step. Relaxation in more than one step, in particular over a relatively long distance, is preferred. A particularly advantageous rate of relaxation here is <5%/s, and a very large part of the relaxation should take place at temperatures of <233° C., more preferably <210° C. At least 0.7% relaxation should take place at temperatures of <210° C. High rates of relaxation and high relaxation temperatures give a lower reduction in transverse shrinkage with at the same time a marked reduction in longitudinal shrinkage. For the reasons mentioned this is a disadvantage. The extent of total relaxation must in turn be selected individually for each production plant in such a way that the measured variables given lie within the range claimed. With a total relaxation of 8% combined with a setting temperature of 230° C., a 3%/s rate of relaxation is suitable for achieving the desired values of MC.

The film is then cooled and wound up. The process described here for producing polyester films with reduced transverse shrinkage is applicable not only to polyester but also to other thernoplastic polymers.

The invention is described in more detail below using examples.

EXAMPLES

The following measurement techniques were used to characterize the films.

Shrinkage

Thermal shrinkage was determined on squares of size 10 cm. The specimens are measured accurately ($L_0$) and heat-treated in a circulating air drying cabinet at the temperature stated in each case. The specimens are removed and measured accurately (L) at room temperature.

$$\text{Shrinkage}(\%) = \frac{L_o - L}{L_o} \cdot 100$$

Temperature for 2% Length Increase (T2%)

The temperature T2% at which the increase in length of the film is at least 2% is determined by TMA using equipment from Meftler (TMA40). The increase in length in % of the specimens of size 10×6 mm is measured at a heating rate of 4 K/min and with a constant force of 5 N/mm². The temperature at the start of the test is 30° C.

Density

Densities are determined in accordance with ASTM D 1505-68 by immersing specimens in density gradient columns. The density gradient column is produced using mixtures of $CCl_4$ and heptane.

Modulus of Elasticity

The modulus of elasticity is determined with the Zwick Z010 tensile strain test apparatus. The modulus of elasticity is the quotient calculated from the force per unit of cross-sectional area and the length change on deformation per unit of original length, within the Hooke range. The width of the test strips is 15 mm and the test length is 100 mm. The test is carried out at a temperature of 21° C. with a pull rate of 1 mm/min.

Example 1

PET chips are dried at 160° C. and extruded at from 280 to 310° C. The molten polymer is extruded from a flat-film die and laid electrostatically onto a roll. The film is stretched in the machine direction at 115° C. by a factor of 3.8. Transverse stretching by a factor of 3.8 takes place in a frame at 120° C. The film is then heat-set. The maximum temperature experienced by the film is 231° C. The film is tranversely relaxed by 8% in even stages at a rate of relaxation of 2.5%/s.

Example 2

A film is produced by the process of Ex. 1. The film setting peak, however, is at 237° C. and the transverse stretching ratio is 3.7.

Comparative Example 1

A biaxially oriented film is produced as described in Example 1 except that the film is heat-set at 210° C. (film setting peak).

Comparative Example 2

A biaxially oriented film is produced as described in Example 1, but without transverse relaxation of the film.

Comparative Example 3

A biaxially oriented film is produced as described in Example 1, but the film is relaxed transversely by 2.0%.

Comparative Example 4

A biaxially oriented film is produced as described in Example 1, but this time the film setting peak is at 241° C. and the film is relaxed transversely by 10%.

The films are used to produce film capacitors. The quality of these after heat treatment is assessed. The quality criteria used here are the rejection rate for insulation resistance, ΔC, dielectric dissipation and dielectric strength.

After this assessment the capacitors are exposed to a temperature pattern suitable for reflow solders. The peak temperature is 235° C. The soldering-bath stability of the capacitors is then assessed using the same criteria as are used after the heat treatment.

Table 1 gives the properties of the films from the examples.

TABLE 1

| Film type | Modulus of elasticity (TD) in N/mm² | T2 % in ° C. | S 200 (TD) % | S 200 (MD) % | Number of negative coefficients | MC in ° C. mm²N⁻¹ | Quality of capacitors after heat treatment | Soldering-bath resistance of capacitor |
|---|---|---|---|---|---|---|---|---|
| Example 1 | 4900 | 117 | 0.6 | 3.7 | 0 | 2 | + | + |
| Example 2 | 4500 | 116 | 0.4 | 3.6 | 0 | 1.1 | + | + |
| Comparative Example 1 | 5250 | 150 | 1.7 | 6.2 | 0 | 110 | + | − |
| Comparative Example 2 | 5650 | 167 | 7.4 | 3.9 | 0 | 104 | + | − |
| Comparative Example 3 | 5300 | 153 | 4.1 | 5.5 | 0 | 207 | + | − |
| Comparative Example 4 | 4500 | 115 | −0.1 | 3.0 | 2 | 0.4 | − | + |

What is claimed is:

1. A biaxially oriented PET film having one or more layers and a thickness of ≦10 μm, and having a low transverse shrinkage at high temperatures, where the mechanical consolidation coefficient MC is determined from the following equation:

$$MC = \frac{S200_{TD}[\%](T2\% - 100[°C.])(S200_{MD} - 3.35[\%])}{(E_{ND} - 3000[N/mm^2])} *$$

$$1000[°C. \cdot mm^2 \cdot N^{-1}]$$

and where

MC is ≧−2 and ≦50, and $S200_{TD}$ is the transverse shrinkage in % after 15 min at 200° C., $S200_{MD}$ is the longitudinal shrinkage in % after 15 min at 200° C., T2% is the temperature in ° C. at which the film elongates by 2% under a constant tension of 5 N/mm², and $E_{TD}$ is the transverse modulus of elasticity (tensile modulus) in N/mm².

2. The film as claimed in claim 1, wherein the transverse shrinkage at 200° C. ($S200_{TD}$) is ≦1%.

3. The film as claimed in claim 1, wherein one or both surfaces of the film have been coated with a functional layer.

4. A process for producing a thermoplastic PET film, where a PET melt is extruded onto a chill roll and then sequentially stretched longitudinally and then transversely, or transversely and then longitudinally, or simultaneously longitudinally and transversely, and, if desired, is then again stretched longitudinally and/or transversely, and is then heat-set at from 200 to 260° C., where the film is relaxed transversely during the heat-setting at a rate of relaxation of <20%/s, and where the maximum temperature experienced by the film during the production process is >210° C. (measured by DSC analysis on the finished film).

5. The process as claimed in claim 4, wherein the film is relaxed by from 5 to 15% during the heat-setting.

6. The process as claimed in claim 4, wherein the rate of relaxation is <10%/s.

7. The process as claimed in claim 5, wherein the rate of relaxation is <5%/s.

8. The process according to claim 4, wherein the rate of relaxation is >0.7%/s.

* * * * *